(12) United States Patent
Wolfe

(10) Patent No.: US 11,091,127 B1
(45) Date of Patent: Aug. 17, 2021

(54) WINDSHIELD WIPER WITH JET EJECTORS FOR USE IN VEHICLES

(71) Applicant: James L. Wolfe, Sheboygan, WI (US)

(72) Inventor: James L. Wolfe, Sheboygan, WI (US)

( * ) Notice: Subject to any disclaimer, the term of this patent is extended or adjusted under 35 U.S.C. 154(b) by 0 days.

(21) Appl. No.: 15/964,614

(22) Filed: Apr. 27, 2018

(51) Int. Cl.
*B60S 1/52* (2006.01)
*B60S 1/38* (2006.01)

(52) U.S. Cl.
CPC .............. *B60S 1/524* (2013.01); *B60S 1/38* (2013.01); *B60S 2001/3837* (2013.01)

(58) Field of Classification Search
CPC B60S 1/524; B60S 1/3415; B60S 2001/3837; B60S 1/522; B60S 1/38
USPC .......... 15/250.04, 250.41, 250.02; 239/284.1
See application file for complete search history.

(56) References Cited

U.S. PATENT DOCUMENTS

| | | | |
|---|---|---|---|
| 1,647,319 A * | 11/1927 | Shults | B60S 1/50 15/250.04 |
| 2,918,689 A * | 12/1959 | Pruett | B60S 1/524 15/250.04 |
| 3,913,167 A | 10/1975 | Frigon | |
| 4,192,038 A * | 3/1980 | Klein | B60S 1/524 15/250.04 |
| 5,065,471 A * | 11/1991 | Laplante | B60S 1/3415 15/250.04 |
| 8,898,849 B2 | 12/2014 | Jeuffe et al. | |
| 2002/0053112 A1 * | 5/2002 | Ohyama | B60S 1/38 15/250.43 |

* cited by examiner

*Primary Examiner* — Gary K. Graham
(74) *Attorney, Agent, or Firm* — Jonathan M. D'Silva; MMI Intellectual Property

(57) ABSTRACT

The present invention is a windshield wiper with jet ejectors for use in vehicles. Each windshield wiper with jet ejectors includes a movable arm that oscillates a frame. Frame is provided with and oscillates along with at least one flexible element and a jet ejector. Cleaning fluid tube is connected to jet ejector and supplies cleaning fluid to jet ejector. Oscillation of frame causes distribution of cleaning fluid in jet ejector. Jet ejector has a number of openings though which distributed cleaning fluid is ejected out on windshield of vehicle. Simultaneous action of ejection of cleaning fluid and oscillation of flexible element(s) provide cleaning of windshield along the entire length of frame. Thus, conventional partial cleaning of windshield due to inappropriate distribution of cleaning fluid is eliminated by distributing fluid along the entire length of windshield wiper. Appropriate and fast cleaning of windshield increases visibility improvement for the driver.

5 Claims, 3 Drawing Sheets

WINDSHIELD WIPER WITH JET EJECTORS FOR USE IN VEHICLES

BACKGROUND OF THE INVENTION

1. Field of the Invention

The present disclosure relates to a windshield wiper of a vehicle. More particularly, the present disclosure relates to a windshield wiper provided with jet ejectors for ejecting cleaning fluid.

2. Description of the Related Art

In a vehicle, a jet of fluid is sprayed on windshield/pane from a stationary nozzle provided in a bonnet of vehicle and a pair of windshield wipers is oscillated to clean windshield/pane. However, jet released from stationary nozzle may not be thrown up to uppermost portion of windshield wiper and hence middle and/or uppermost regions of windshield/pane may not be cleaned. Over a period, if not manually cleaned, dirt gets accumulated on middle and/or uppermost regions which lower visibility through windshield/pane and increases chances of accidents.

Several designs of various windshield wipers have been designed in the past. None of them, however, include a windshield wiper that is ejecting a jet of fluid along the length of windshield wiper to effectively clean windshield/pane of a vehicle.

Applicant believes that a related reference corresponds to U.S. Pat. No. 8,898,849 filed by Peugeot Citroen Automobiles titled "Windscreen wiper blade having a built-in washer liquid conduit" discloses a windshield wiper having elongate flexible strip for cleaning windshield with a cap enclosing flexible strip and a built-in conduit provided with a nozzle offset on the side of the flexible strip for ejecting cleaning fluid. However, as the nozzle is provided offset to flexible strip, cleaning is effective only when flexible strip moves following offset nozzle because offset nozzle introduces cleaning fluid followed by cleaning by flexible strip. But in other direction, flexible strip moves first followed by offset nozzle which may not result in efficient cleaning. Hence, energy consumed by flexible strip is not fully utilized for purpose of cleaning. Also, the structure of nozzle is of complex shape and hence difficult to manufacture resulting in increased cost of product.

Another U.S. Pat. No. 3,913,167 filed by Sprague Devices Inc titled 'Windshield washer nozzle device' discloses a nozzle device which is connected to the wiper and moves with it across the windshield depositing a cleaning fluid thereon. However, the nozzle may not be able to eject cleaning fluid over the entire length of wiper and hence may not effectively clean windshield.

Other documents describing the closest subject matter provide for a number of more or less complicated features that fail to solve the problem in an efficient and economical way. None of these patents suggest the novel features of the present invention.

SUMMARY OF THE INVENTION

In view of the above, it is an objective of the present invention to solve or at least reduce the problems discussed above. The present invention is a windshield wiper with jet ejectors for use in vehicles that facilitates easy, fast and efficient cleaning of windshield/pane of vehicle. For this purpose, each windshield wiper with jet ejectors is provided with a movable arm that oscillates a frame. Frame is provided with and oscillates alongwith at least one flexible element and a jet ejector. Cleaning fluid tube is connected to jet ejector and supplies cleaning fluid to jet ejector. Oscillation of frame causes distribution of cleaning fluid in jet ejector. Jet ejector has a number of openings though which distributed cleaning fluid is ejected out on windshield of vehicle. Simultaneous action of ejection of cleaning fluid and oscillation of flexible element(s) provide cleaning of windshield along the entire length of frame. Thus, conventional partial cleaning of windshield due to inappropriate distribution of cleaning fluid is eliminated by distributing fluid along the entire length of frame of windshield wiper.

It is one of the main objects of the present invention is to provide a windshield wiper configured with jet ejectors on the entire length of windshield wiper for facilitating cleaning of a windshield of a vehicle.

It is another object of this invention is to provide a windshield wiper with jet ejectors that facilitate cleaning in to and fro movements of windshield wiper and hence consumes less time and less power for cleaning.

It is another object of this invention is to provide a windshield wiper with jet ejectors that are simple in structure and hence easy to manufacture at economical cost.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
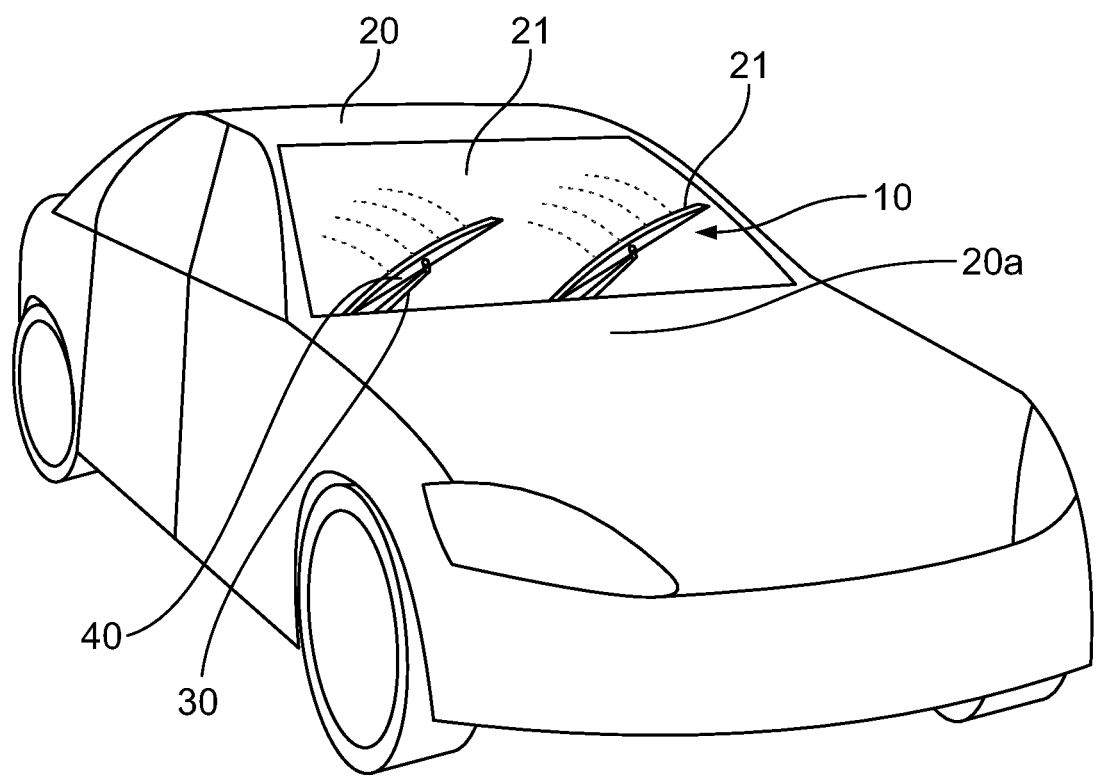
FIG. 1 represents a perspective representation of a windshield wiper ejecting cleaning fluid from entire length of windshield wiper of a vehicle, in accordance with one embodiment of the present invention.
Figure 2:
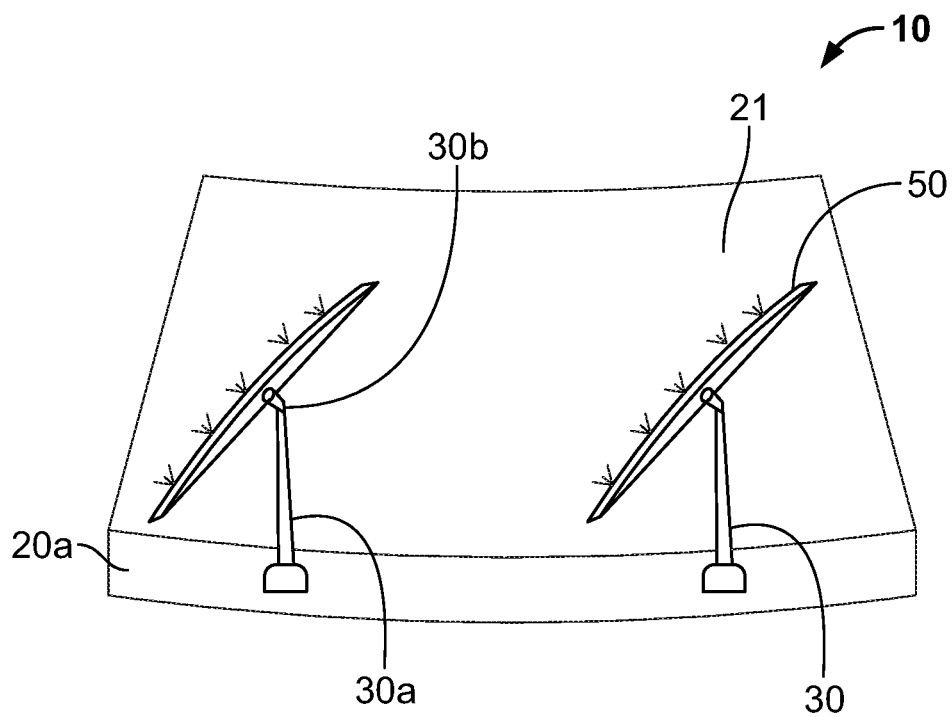
FIG. 2 represents an enlarged perspective view of windshield wiper and windshield of FIG. 1.
Figure 3:
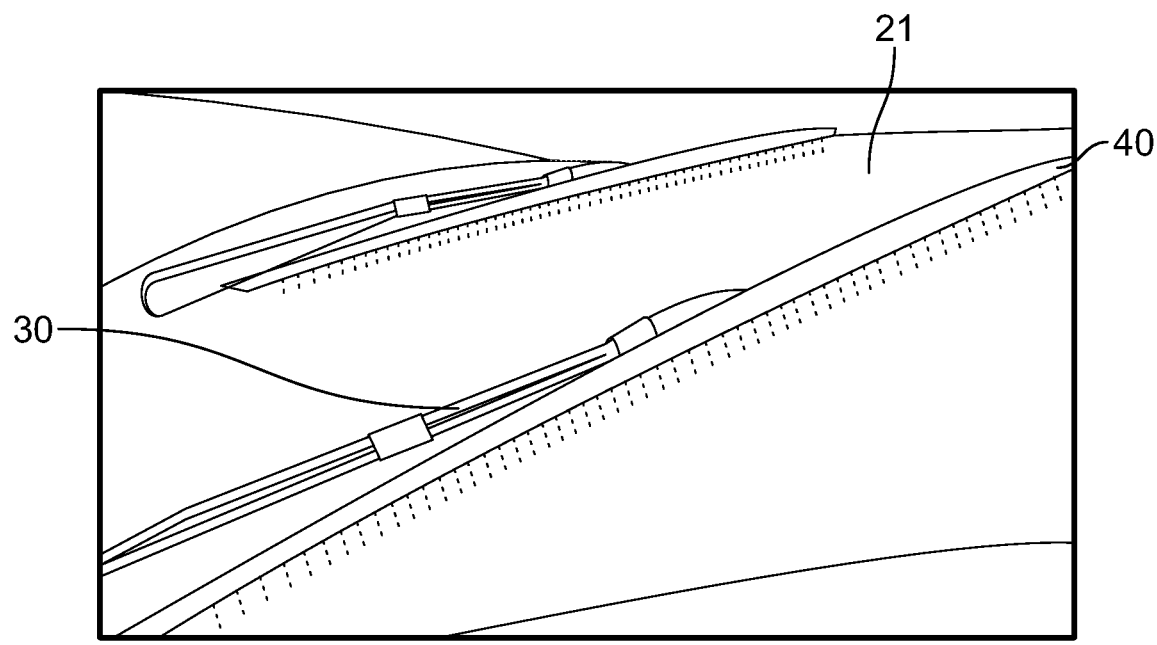
FIG. 3 represents an enlarged view of windshield wiper of FIG. 1.
Figure 4:
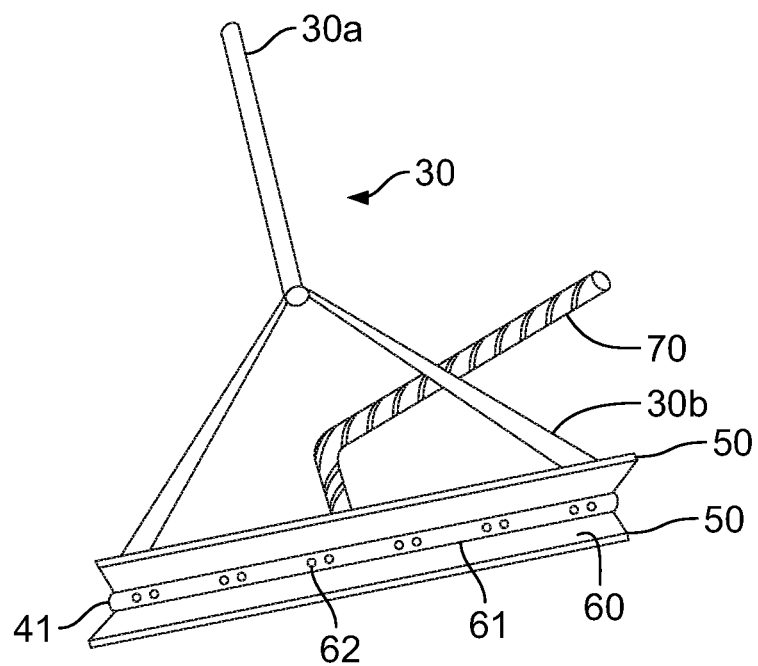
FIG. 4 represents a perspective view of windshield wiper of FIG. 1 in an inoperative configuration.
Figure 5:
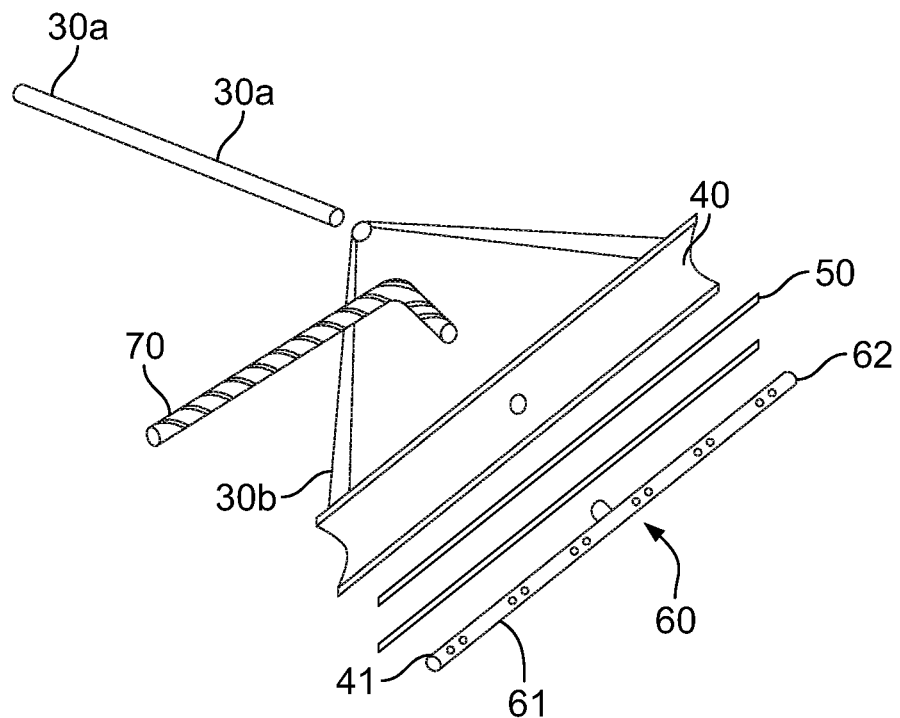
FIG. 5 represents an exploded view of windshield wiper of FIG. 1.

Referring now to the drawings (FIGS. 1 to 5), where the present invention is generally referred to with numeral 10, it can be observed that a windshield wiper with jet ejectors, in accordance with one embodiment, is provided for a vehicle 20. Depending on size of windshield 21 of vehicle 20, one or more windshield wiper with jet ejectors 10 can be provided. Each windshield wiper with jet ejectors 10 includes a movable arm 30, a frame 40, at least one flexible wiper blade element 50, a jet ejector 60 and at least one cleaning fluid tube 70.

Movable arm 30 has two end portions, namely a first end portion 30a and a second end portion 30b. First end portion 30a is pivotally connected to a bonnet 20a of a vehicle 20 and second end portion 30b is connected to the frame 40. Second end portion 30b oscillates around the pivot i.e. first end portion 30a.

Frame 40 is connected to second end portion 30b. Frame 40 oscillates along with movable arm 30. Frame 40 accommodates and houses flexible element(s) 50 and jet ejector 60.

Flexible element(s) 50 are in contact with windshield 21 of vehicle 20 and during oscillation facilitates cleaning of windshield 21. In depicted embodiment, a pair of flexible elements 50 is provided on either side of jet ejector 60. However, the number of flexible element 50 can be one or more, depending on the size of frame 40.

In one embodiment, jet ejector 60 includes a jet frame 61 configured with a number of ejection openings 62. Jet frame 61 is housed in substantially the entire length of frame 40. In one embodiment, frame 40 is a tubular element configured with number of openings 62 and has end portions closed with caps 41. In another embodiment, frame 40 is a substantially flat element with number of ejection openings 62. Flat element is positioned such that a channel (not illustrated in Figures) is formed between flat element and frame 40 through which cleaning fluid passes. Number of openings 62 is variable factor and any number of openings 62 can be provided. Shape and size of openings 62 can also be selected as desired. Material of jet ejector 60 can be, but not limited to, metallic or polymeric.

Cleaning fluid tube 70 is typically a flexible or rigid tube which connects cleaning fluid storage reservoir (not illustrated in Figures) and jet ejector 60. Cleaning fluid passes from storage reservoir to jet ejector 60 with or without external pumping force. Cleaning fluid received in jet ejector 60 is ejected out from openings 62 on windshield 21.

In operation, upon actuation by user seated in vehicle, cleaning fluid, like water is circulated from cleaning fluid tube 70 to jet ejector 60. In jet ejector 60, because of oscillation of frame 40, cleaning fluid is distributed in the internal areas of jet frame 61 and ejected out from openings 62 on windshield 21. Simultaneously, flexible element(s) 50 facilitates rubbing action of cleaning fluid on windshield 21 which provides clean washing of windshield 21. As the jet frame 61 is provided along the length of frame 40, cleaning fluid is ejected from the entire length of frame 40 and provides effective cleaning in the entire length of frame 40. Also, as flexible elements 50 are provided on either side of jet frame 61, either directional move of flexible elements 50 cleans windshield which results in less cleaning time and less power required for cleaning. Also, owing to simple positioning and design of jet ejector 60, manufacturing is easy and at economical cost.

In one embodiment, windshield wiper with jet ejectors 10 can be provided on frontal windshield or windshield provided at the back. Cleaning liquid, along with water, can also be pressurized air or liquidized soap that facilitates cleaning during maintenance of vehicle 20.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A windshield wiper, comprising:
a movable, elongated wiper arm including a first end portion and a second end portion, the first end portion having a base, said base mounted to a vehicle, said second end portion includes a distal end pivotally mounted to an elongated frame being generally rectangular in shape and being laterally curved, wherein said frame having an opening on a center portion of said frame, wherein said frame includes two side ends having C-shape indentations, wherein said frame includes spaced first and second elongated edges, wherein said first edge and said second edge each receive said wiper blade elements being of separated material non-continuous with one another, wiper blade element, wherein said flexible wiper blade elements are adapted to facilitate rubbing action on a windshield of said vehicle, wherein said frame further includes an opening on a center portion of said frame, wherein a jet ejector is mounted horizontally on said frame, wherein said jet ejector is a cylindrical tubular member having a first end and a second end, wherein said first end and said second end are each enclosed with a circular cap, wherein said jet ejector further includes a protrusion located on a middle portion, wherein said protrusion is inserted into said opening on a front end of said frame and communicably mounted with a cleaning fluid tube through said opening on a back end of said frame, wherein said jet ejector includes pairs of two ejection openings equally dispersed along said jet ejector, wherein said second end portion is attached to said frame, wherein said second end portion is an attachment member engages with said frame at said back end, wherein said attachment member forms a V-shape with said movable wiper arm and is joined to said frame substantially at said two side ends, wherein said cleaning fluid tube is within said V-shape, wherein said first end portion and said second end portion form a Y-shape with said frame.

2. The windshield wiper of claim 1 wherein said first end portion is substantially vertical.

3. The windshield wiper of claim 1, wherein said flexible wiper blade elements extend the entire length of said first edge and said second edge.

4. The windshield wiper of claim 1, wherein said cleaning fluid tube is an L-shaped tube member attached to said protrusion.

5. The windshield wiper of claim 1, wherein said jet ejector extends an entire length of said center portion of said frame.

* * * * *